United States Patent
Khibnik (10) Patent No.: US 9,840,935 B2
(45) Date of Patent: Dec. 12, 2017

(54) ROTATING MACHINERY MONITORING SYSTEM

(71) Applicant: United Technologies Corporation, Hartford, CT (US)

(72) Inventor: Alexander I. Khibnik, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 406 days.

(21) Appl. No.: 14/662,721

(22) Filed: Mar. 19, 2015

(65) Prior Publication Data

US 2015/0345325 A1   Dec. 3, 2015

Related U.S. Application Data

(60) Provisional application No. 61/972,727, filed on Mar. 31, 2014.

(51) Int. Cl.
*F02C 3/04* (2006.01)
*F01D 21/00* (2006.01)
*G01M 15/14* (2006.01)

(52) U.S. Cl.
CPC .......... *F01D 21/003* (2013.01); *G01M 15/14* (2013.01)

(58) Field of Classification Search
USPC ... 60/772, 773, 800, 803, 39.34, 39.35, 804, 60/722, 725, 418, 448, 449, 700, 702, 60/706, 712
See application file for complete search history.

(56) References Cited

U.S. PATENT DOCUMENTS

| | | | |
|---|---|---|---|
| 4,326,804 A * | 4/1982 | Mossey | G01B 11/14 250/224 |
| 4,887,468 A | 12/1989 | McKendree et al. | |
| 5,479,826 A | 1/1996 | Twerdochlib et al. | |
| 5,686,669 A | 11/1997 | Hernandez et al. | |
| 6,321,602 B1 | 11/2001 | Ben-Romdhane | |
| 6,445,995 B1 | 9/2002 | Mollmann | |
| 6,918,747 B2 | 7/2005 | Comperat et al. | |
| 7,214,925 B2 | 5/2007 | Wagoner et al. | |
| 7,455,495 B2 * | 11/2008 | Leogrande | F01D 11/24 415/1 |
| 7,532,988 B2 | 5/2009 | Khibnik et al. | |
| 8,256,277 B2 | 9/2012 | Khibnik et al. | |
| 8,459,103 B2 | 6/2013 | Khibnik et al. | |

(Continued)

FOREIGN PATENT DOCUMENTS

GB   2500317   9/2013
JP   2004096888   3/2004

OTHER PUBLICATIONS

Extended European Search Report for Application No. 15161746.1 dated Jan. 27, 2016.

*Primary Examiner* — Binh Q Tran
(74) *Attorney, Agent, or Firm* — Carlson, Gaskey & Olds, P.C.

(57) ABSTRACT

A method for monitoring rotating component includes receiving a continuous waveform sensor signal from a sensor apparatus, retaining the continuous waveform in a memory, and isolating at least one characteristic and/or at least one period of the waveform. The isolated characteristic and/or period is analyzed thereby determining the presence of a waveform anomaly.

14 Claims, 5 Drawing Sheets

(56) References Cited

U.S. PATENT DOCUMENTS

| | | | |
|---|---|---|---|
| 9,014,460 B2* | 4/2015 | Twerdochlib | F01D 21/14 382/100 |
| 9,016,132 B2* | 4/2015 | Russhard | F01D 17/02 702/56 |
| 2007/0128016 A1* | 6/2007 | Dasgupta | F01D 11/20 415/14 |
| 2009/0019938 A1 | 1/2009 | Klosinski | |
| 2010/0191502 A1* | 7/2010 | Ren | G01B 7/14 702/155 |
| 2011/0150649 A1 | 6/2011 | White et al. | |
| 2013/0006541 A1 | 1/2013 | Kominsky | |
| 2013/0226518 A1* | 8/2013 | Jousselin | G01H 1/003 702/176 |
| 2013/0275059 A1 | 10/2013 | Bernhard et al. | |
| 2014/0003939 A1 | 1/2014 | Adams et al. | |
| 2014/0007591 A1 | 1/2014 | Khibnik et al. | |

* cited by examiner

ROTATING MACHINERY MONITORING SYSTEM

CROSS-REFERENCE TO RELATED APPLICATION

This application claims priority to U.S. Provisional Application No. 61/972,727 filed on Mar. 31, 2014.

STATEMENT REGARDING GOVERNMENT SUPPORT

This invention was made with government support under Contract No. N00019-02-C-3003 awarded by the United States Navy. The Government has certain rights in this invention.

TECHNICAL FIELD

The present disclosure relates to rotor blade monitoring and more specifically to rotor damage detection and prevention systems for a gas turbine engine.

BACKGROUND

During operation of a gas turbine engine, foreign object debris (debris from outside the engine) and domestic object debris (debris from inside the engine) can contact (impact) a spinning rotor blade. The contact with the debris can cause instantaneous damage to the blade or impending blade failure. Instantaneous damage to the blade occurs when the debris causes a nick, scratch, bend or other observable permanent defect primarily due to the impact event itself. Impending failure occurs primarily during continuing engine operations. The impact event can also serve as an indicator of the primary or secondary debris travelling through the gaspath and potentially causing engine distress.

Detecting blade impact events which cause instantaneous blade damage is practical using standard blade-tip-timing (BTT) techniques, as the alteration in the performance of the rotor blades is permanent and repeats itself, but still the success of these techniques depends on damage size and location. In contrast, however, impacted rotor blades with impending failure can frequently return to their original geometry and performance relatively quickly. Existing sensor systems and signal processing systems frequently have difficulty identifying the impending damage, due to how quickly the blades return to their prior performance.

Prior systems can be broadly divided into two categories. In the first category, the output of the sensor arrangement is a sequence of blade pulses corresponding to observing (detecting) blade raw as rotor is spinning. Such systems lack the ability to output waveforms. Furthermore, an impacted blade can go undetected in such sensor arrangement, or can be represented by a pulse that is not easily recoverable from noise or distinguishable from a spurious pulse. For some rotors, direct detection of blade pulses limits the observation of all blades by a given sensor arrangement (this may occur if blade geometry varies between blades on the same rotor).

The second broad category includes sensor arrangements that output a full waveform, either directly, or after signal conditioning. The waveform can be processed to extract blade pulses and then the waveform is discarded.

SUMMARY OF THE INVENTION

A method for monitoring rotating component, according to an exemplary embodiment of this disclosure, among other possible things includes receiving a sensor signal from a sensor apparatus, wherein the sensor signal includes a continuous waveform representative of a sensor output, retaining the continuous waveform in a memory, and isolating at least one of at least one characteristic and at least one period of the waveform and analyzing the at least one of at least one characteristic and at least one period and thereby determining a waveform anomaly.

A further embodiment of the forgoing method includes isolating at least one of at least one characteristic and at least one period of the waveform and analyzing the at least one of at least one characteristic and at least one period and thereby determining the presence of an event includes comparing an isolated period from the continuous waveform against a reference period and determining the presence of a waveform anomaly based on the comparison.

In a further embodiment of the forgoing method detection of a waveform anomaly indicates the presence of a blade strike event.

A further embodiment of the forgoing method includes analyzing the at least one of at least one characteristic and at least one period and thereby determining the presence of an event includes further determining a similarity measure between a reference period and an isolated period of the continuous waveform, and determining if the similarity measure exceeds a threshold.

A method for monitoring rotor blades, according to an exemplary embodiment of this disclosure, among other possible things includes receiving a sensor signal from a sensor apparatus, wherein the sensor signal includes a continuous waveform representative of a sensor output, comparing a period of the received sensor signal to a reference period and determining a presence of blade strike based on a difference between the reference period and the received waveform.

A further embodiment of the forgoing method includes isolating a period corresponding to a single blade of a sensed rotor and generating a correlated set of sequential periods corresponding to the single blade.

In a further embodiment of the forgoing method the reference period is one of a static period stored in a memory, a predicted period derived from one or more previous rotations of a corresponding rotor, a predicted period derived from one or more future periods of the corresponding rotor, and a predicted period derived from a combination of previous periods of the corresponding rotor and future periods of the corresponding rotor.

In a further embodiment of the forgoing method the received period is a digitized sensor output.

In a further embodiment of the forgoing method the received sensor signal is an analog sensor output.

A further embodiment of the forgoing method includes comparing the received sensor signal to a reference period includes determining a similarity measure between the received period of the sensor signal and the reference period.

In a further embodiment of the forgoing method the similarity measure is at least one of a vector-time domain distance, a spectral distance, and a correlation distance.

A further embodiment of the forgoing method includes determining a presence of a blade strike based on a difference between the reference period and the received signal includes determining that the similarity measure exceeds a threshold.

In a further embodiment of the forgoing method the threshold is a dynamic threshold determined from derived characteristics of prior similarity measures.

A further embodiment of the forgoing method includes validating the received sensor signal by comparing at least one characteristic of the received sensor signal against an expected value of the at least one characteristic.

A further embodiment of the forgoing method includes comparing a period of the received sensor signal to a reference period and determining a presence of a blade strike based on a difference between the reference period and the received signal are performed in real time.

A turbine engine according to an exemplary embodiment of this disclosure, among other possible things includes a compressor section, a combustor section fluidly connected to the compressor section, a turbine section fluidly connected to the combustor section, wherein each of the compressor section and the turbine section includes a plurality of rotors, each rotor having a plurality of radially outward protruding rotor blades, an engine case disposed about the compressor section, the combustor and the turbine section, at least one sensing system disposed within sensing distance of a rotor, and a controller connected to the sensing system and operable to receive a full waveform output from the sensing system.

A further embodiment of the forgoing gas turbine engine includes the controller further including a memory operable to cause the controller and the sensing system to perform the steps of receiving a sensor signal from the sensing system, wherein the sensor signal includes a continuous waveform representative of a sensor output, comparing the received sensor signal to at least a reference period, and determining a presence of a blade strike event based on a difference between the reference period and the received signal.

In a further embodiment of the forgoing gas turbine engine the reference period is one of a static period stored in a memory, a received period from a previous rotation of a corresponding rotor, a combination of a received period from at least two previous rotations of a corresponding rotor, a received period from a future rotation of the corresponding rotor, a combination of received periods from at least two future rotations of the corresponding rotor, and a combination of a received period from at least one previous rotation of the corresponding rotor and a received period from at least one future rotation of the corresponding rotor.

In a further embodiment of the forgoing gas turbine engine the at least one sensing system including a plurality of sensors, wherein each of the sensors is supported via the case with sensing distance of a corresponding rotor.

These and other features of the present invention can be best understood from the following specification and drawings, the following of which is a brief description.

DETAILED DESCRIPTION OF AN EMBODIMENT

Figure 1:
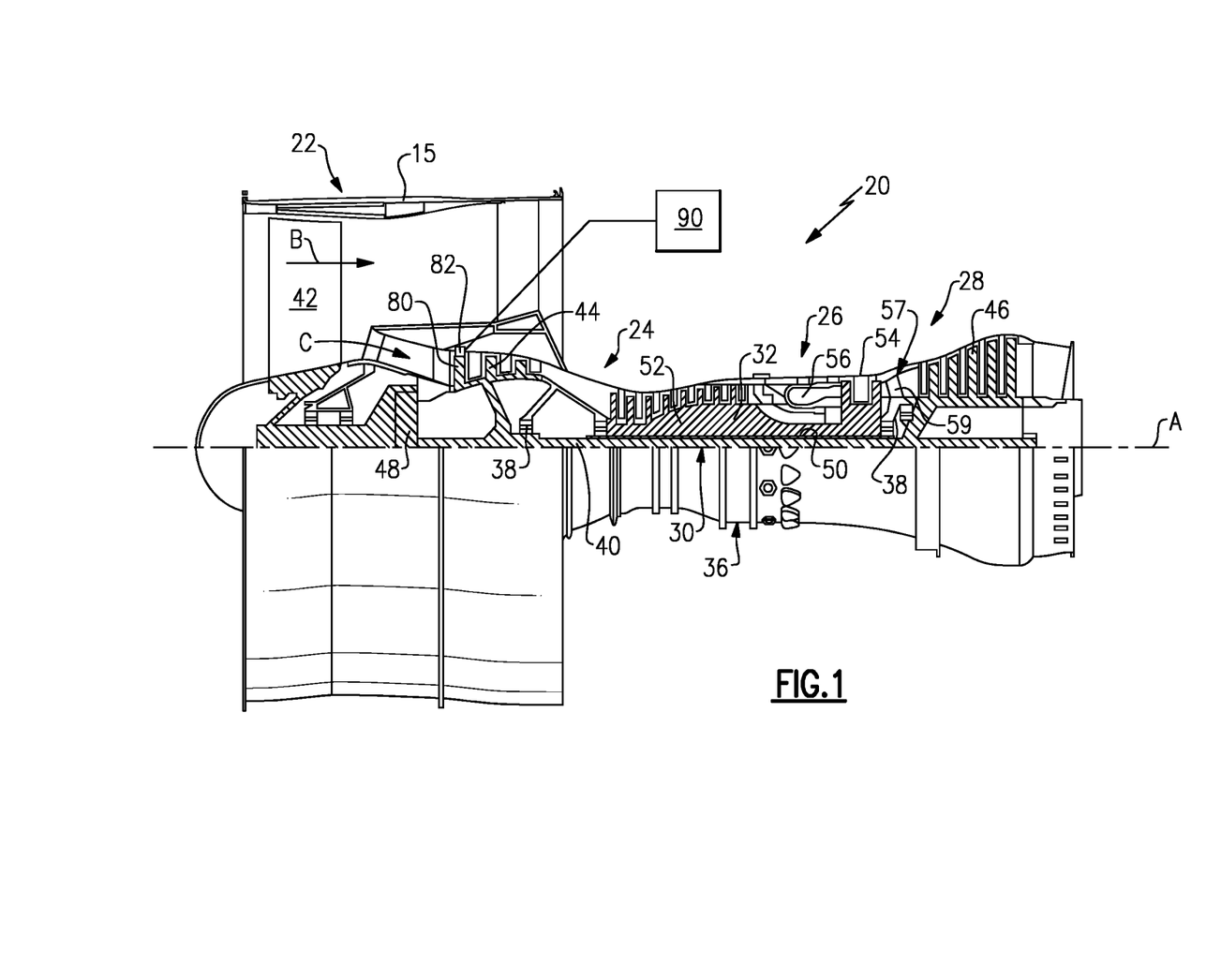
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Current gas turbine engines use a blade time of arrival measurement (also referred to as blade-tip-timing or BTT) to determine blade displacement as a function of a time-like variable which is typically a revolution number. In a blade time of arrival system, sensing system determines a sensor signal as each rotor blade tip passes the sensor. Each sensor signal for a given blade is sequenced in a time series which is translated into displacement values for the given blade. The resulting series of displacement values for each blade are analyzed using signal processing techniques to determine outliers (pulses occurring at an unexpected time) that can qualify as resulting from a foreign object debris contact or a domestic object debris contact. In systems with two or more blade health sensors are looking at the same rotor, the indications from each sensor can be compared for each blade, and if multiple sensors indicate the same blade, had an impact, a strike can be determined with a higher precision. Blade impact events are analyzed, recorded and communicated to engine operator, maintenance crews, and/or engine support teams for further action. Depending on the blade health monitoring system configuration blade displacement data can be processed in real time for detecting blade strike or other monitoring functions or saved in memory for post-run processing and analysis.

Disposed adjacent a first rotor 82 in the low pressure compressor 44 is a sensor arrangement 80. The sensor arrangement 80 is part of a sensor system that detects blade tips of each rotor blade of the rotor 82 as the rotor blades pass by the sensor arrangement 80. The sensor arrangement 80 outputs a sensor signal to a controller 90, such as a Full Authority Digital Engine Control (FADEC). The controller 90 includes at least a signal controller and a signal conditioner. The signal controller and the signal conditioner can be software modules within a digital control program, or separate physical modules communicatively coupled to the main controller portion of the controller 90. In some examples the signal controller and the signal conditioner are integrated with the controller 90. In other examples the signal conditioner and the signal controller can be a stand-alone component of the sensor system containing the sensor arrangement 80, or otherwise located apart from the controller 90. In the alternate examples, the signal conditioner and the signal controller are in electronic communication with the controller 90.

The sensor system outputs a continuous waveform containing the time history of rotor blade tips passing the sensing system. The waveform output is then transmitted to the controller 90 which extracts blade arrival times (pulses), and sorts the pulses into a time series sequence corresponding to blade displacement of each individual rotor blade on the rotor 82. By way of example, on a sixteen blade rotor 82, the controller 90 determines sixteen unique time series sequences with each time series sequence corresponding to a given blade of the rotor 82. In previous blade monitoring systems the continuous waveform is not retained after the blade pulses have been extracted. The system illustrated and described herein retains and makes available the continuous waveform for blade impact detection and other applications within blade health monitoring system.

When a debris impact occurs, either due to foreign object debris or domestic debris, the impacted blade vibrates. The vibration is referred to as blade ringing. The blade ringing decreases over time, eventually disappearing. When the impact causes instantaneous damage, the geometry of the impacted rotor blade is permanently altered, and the sensing system can observe the damaged state each time the impacted blade passes a sensor, assuming the damaged state causes measurable change above noise level in appropriate blade displacement characteristics. When the impact causes impending failure, the blade returns to the original blade geometry after the ringing dies out, and the sensing system is no longer able to detect and report the impact event and related data once the ringing has disappeared. In some instances, the ringing amplitude can be lower than a blade displacement noise level, and the previous sensing systems cannot detect the blade strike at all. In yet further instances, the blade ringing can decrease below a detectable level before the sensing system senses that particular rotor blade, again resulting in the impending failure going undetected. It is further understood that the particular arrangement and connections between the rotor blades and the rotating hubs can affect the vibrations resulting from an impact. It is also further understood that the blade configuration, composition, and manufacturing can impact the vibrations resulting from an impact.

The ability to detect a blade strike event and collect and report data related to the event before these data have disappeared increases a time window and the choice of options available for accommodation or compensation steps. Some of these steps include actions aimed at improved safety of machine operation, actions aimed at earlier detection of impending engine distress, and/or actions aimed at increasing parts life, or actions aimed at optimizing engine maintenance metrics. Blade monitoring for debris strike is typically a continuously performed function during equipment operation, unless some portion of the operation is excluded from such monitoring. For example, a portion of engine operation can be excluded due to a low probability of debris strikes. Data continuously developed during performance of the blade monitoring function, particularly in real time mode, is valuable and can be stored for later analysis and trending (including noise trending), even if no strike was found.

In the illustrated example of FIG. 1, the sensor arrangement 80 is positioned on the gas turbine engine case, and views a rotor 82 in a generally radial direction. As with the previously utilized blade monitoring systems, the sensing system containing the sensor arrangement 80 generates a characteristic waveform for each blade of the rotor 82, as the rotor blades pass the sensor arrangement 80. Unlike previous blade monitoring systems, which output only a pulse, the sensing system and the downstream controller 90 retain a full waveform representative of the rotor blade approaching, passing, and leaving a sensor in the sensor arrangement 80.

The sensing system passes the full waveform to the controller 90. The controller 90 receives the waveform, and isolates each period of the waveform corresponding to a given rotor blade. As used herein, "period" refers to a given time period of a waveform that corresponds to a single rotor blade while "multi-period" refers to a given time period that corresponds to multiple rotor blades passing the sensor view. The periods for each rotor blade are then sorted by the controller 90. In one example, illustrated in FIG. 4A, the periods for each rotor blade are sorted into time series sequences corresponding to each individual rotor blade on the rotor 82. Thus, the controller 90 determines a continuous waveform for each rotor blade, with the continuous waveform being representative of the sensor output for the corresponding rotor blade. In this example, the controller 90 receives an analog signal from the sensing system and converts the analog signal to a high resolution digital signal. In an alternate example, illustrated in FIG. 4B, the periods for each rotor blade are aligned and compared in a stacked signal configuration. In some examples, alignment can involve normalizing to the common scale and reference.

In alternative examples, the sensing system can includes an internal controller including a signal controller switch and a signal conditioner (See FIG. 2, described below) in addition to the sensor arrangement 80. The internal controller can perform the time sequencing and sorting at the sensing system. In the alternative example, the sensing system outputs the continuous waveform(s) for each rotor blade to the controller 90, and the controller 90 can perform operations and determinations based on the received waveform in real time. In some examples, the sensing system converts the sensor signal into a high resolution digital signal prior to providing the signal to the controller 90.

Figure 2:
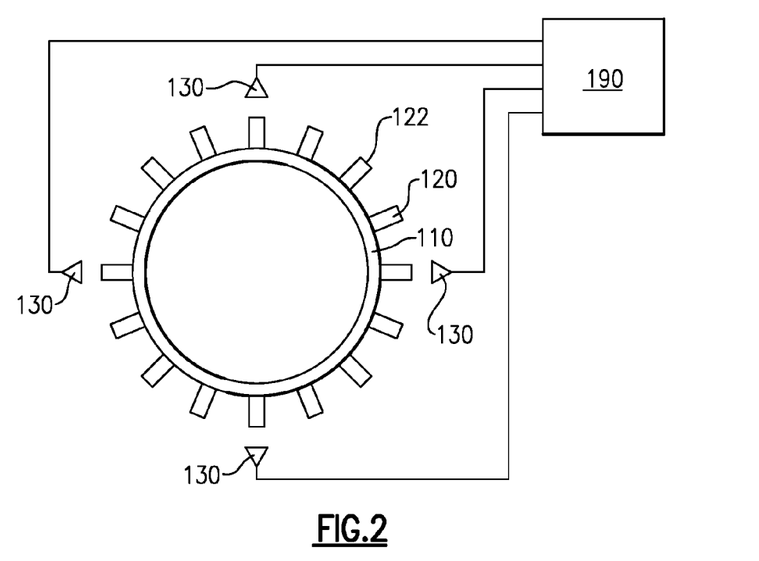
FIG. 2 schematically illustrates an alternate sensing system disposed about a rotor.

FIG. 2 schematically illustrates an alternate sensing system 180 disposed about a rotor 110. The rotor 110 includes sixteen rotor blades 120 protruding radially outward from the rotor 110. Each rotor blade has a tip 122 on a radially outward edge of the rotor blade 120. Disposed radially outward of the tips 122 of the rotor blades 120 at four distinct locations are sensors 130, forming the sensor arrangement. Each of the sensors 130 is connected to a sensor controller 190. In the illustrated example of FIG. 2, the sensor controller 190 is a dedicated sensor system controller including a signal controller and in some examples a signal conditioner, and provides an output to a general gas turbine engine controller 90 (see FIG. 1).

As with the arrangement of FIG. 1, each sensor 130 provides a full waveform output to the sensor controller 190, with the waveform output being representative of the approaching, passing, and receding rotor blades 120.

In a practical implementation, each complete waveform on a sensor signal output is followed by another complete waveform corresponding to the next rotor blade on the rotor 110. This pattern repeats itself as the rotor 110 rotates, with every Nth waveform corresponding to a given blade, where N is the number of blades. By way of example, if a rotor has sixteen blades, then every sixteenth waveform will correspond to the same blade. In the sixteen blade example, the sensing system 100 can receive the full waveforms and correlate the full waveforms into sixteen unique sensor output signals, each of which is a continuous waveform representative of the sensor output for a given rotor blade. In order to create the continuous waveform outputs, the controller 190 separates each period of the base sensor outputs into isolated periods of the waveform, each of which corresponds to a given rotor blade 120 passing a given sensor 130. The periods are then assembled into time series waveforms for each sensor and rotor blade 120. In some examples, there is a step of alignment before assembling, where the alignment can involve normalizing the received waveforms to a common scale and reference.

In the alternate, stacked signal configuration example, the controller 190 correlates the signal identifying a given portion of the sensor signal corresponding to each rotor blade. Once correlated, the signal can be sent to the controller 90 where it is compared in the stacked configuration described below.

Figure 4A:
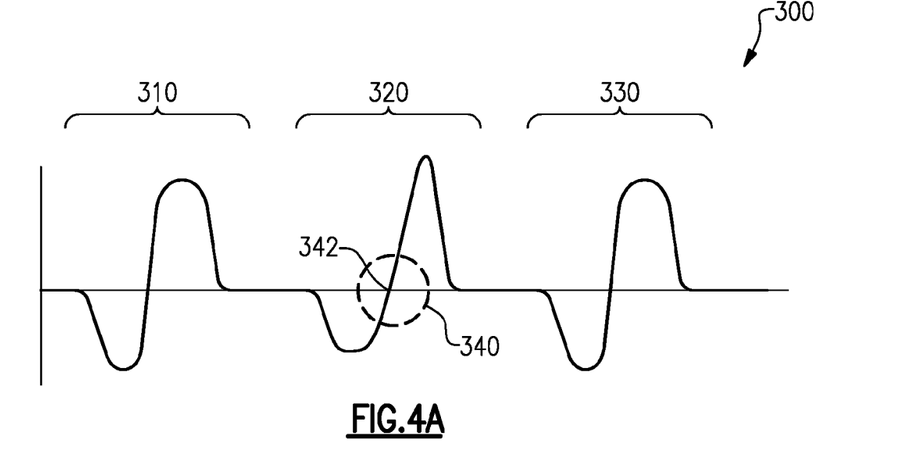
FIG. 4A illustrates an example time series output.
Figure 4B:
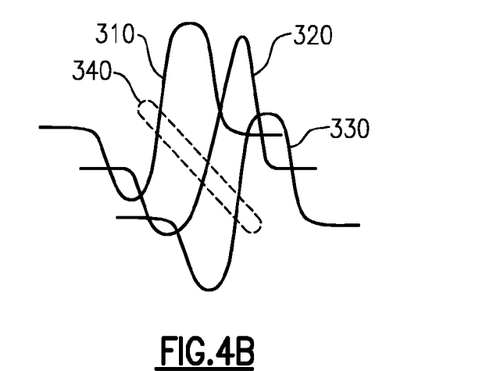
FIG. 4B illustrates an example stacked waveform output.

It is further possible to output the sensor signal from the controller 190 in the above described time series sequences, and have the controller 90 (FIG. 1) perform a stacked analysis as described with regards to FIG. 4.

The utilization of multiple sensors 130 allows the controller 190 to further cross-compare the waveforms for a given rotor blade. The cross comparison allows the controller 190 to determine if an "impending failure" determination is correct, or if the determination is anomalous due to a misaligned sensor, or any other reason. This process is referred to as validating the output signal. In some examples, the validation can be performed on the waveform output from the sensor arrangement including all the periods, or on both the waveform output including all the periods, and the isolated periods.

By running the validation test, the controller 90 can isolate and remove anomalous received waveforms that are the result of sensor error, anomalous shifts in waveform shape, high rate of change of engine parameters, or any other expected occurrence.

Figure 3:
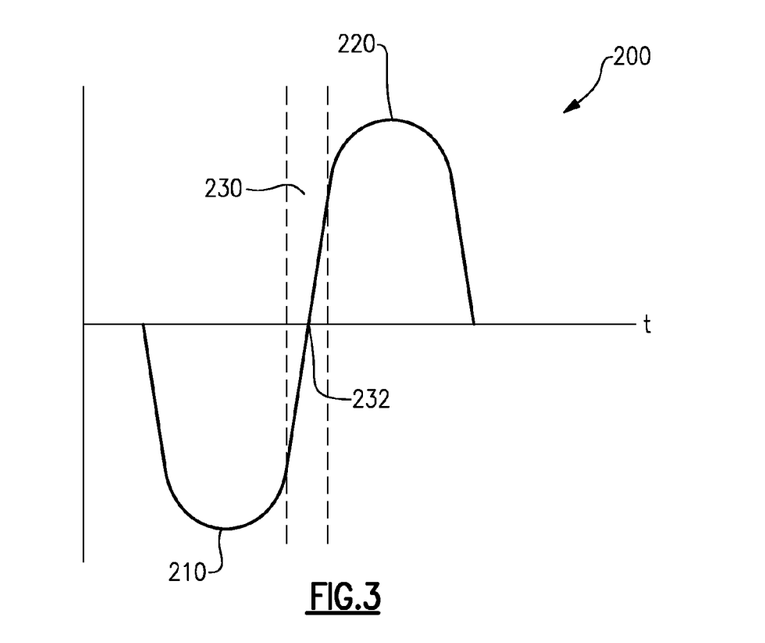
FIG. 3 illustrates an example of a single waveform output by a sensor for a passing rotor blade in the example of FIG. 2

With continued reference to FIG. 2, FIG. 3 illustrates an example of a single period 200 output by a sensor 130 for a passing rotor blade 120. While illustrated herein as a simple sin wave for explanatory purposes, it is understood that the expected wave of a given period can be any waveform and is not limited to a sin wave, or a sin based wave. The period 200 includes a valley 210, and a peak 220. A pulse region 230 occurs at around the zero crossing 232. Previous sensing systems are limited to detecting the passing of a rotor blade by triggering a pulse a unique event during the period corresponding to the given rotor blade. By way of example, some existing systems can trigger on the zero crossing, resulting in an illustrated pulse region 230. The pulse region 230 corresponds to the time period where the rotor blade 120 is most closely aligned with the sensor 130. As described above, each sensor 130 generates a period 200 corresponding to each time a rotor blade 120 passes the sensor 130. The controller 190 sorts all of the received periods 200 as described above for each sensor 130 and each rotor blade.

With continued reference to FIGS. 2 and 3, FIG. 4A illustrates an example time series output 300. The time series output 300 includes three periods 310, 320, 330 of a single rotor blade 120 passing a given sensor 130 connected as a time series waveform. The time series waveform 300 is output to the controller 90 in real time, thereby allowing for the controller 90 to perform real time analysis of the system. In alternative examples, the waveform 300 can be stored in a memory for later analysis by a controller 90, or any other processor.

In the illustrated example of FIG. 4A, a debris impact has occurred at some point between the first period 310 and the second period 320 resulting in a blade ringing. Due to the blade ringing, the zero crossing 342 is shifted resulting in a narrowing of one of the peak or the valley and a stretching of the other of the peak and the valley of the second period 320. By the time the third period 330 has occurred, the ringing has died down and is no longer detectable. In some example impacts, the ringing can last for longer than a single period, and the zero crossing can be shifted in sequential periods 320, 330.

FIG. 4B illustrates an example stacked waveform output that can be utilized in place of the sequential output of FIG. 4A. In the example, the sequential periods 310, 320, 330 are "stacked" with their zero crossings being aligned. Alternatively, the periods can be aligned at any other standard point, such as a start time or an end time, or any other appropriate alignment time. The stacked arrangement allows for a clearer visualization of the skewing of the second period 320, and can result in more efficient analysis depending on the particular analysis system that has been implemented.

When the controller 90 receives each period 310, 320, 330, the period 310, 320, 330 is compared against a reference period to determine a similarity measure between the reference period and the sensed period. The reference period can be a generic reference period stored in a memory of the controller 90, an experimentally determined reference period for the specific engine 20, a predictor based on previous periods sensed by the sensor 130, or an immediately preceding period detected by the sensor 130. By way of example, a generic reference period stored in a memory can be implemented in the form of a lookup table where, by way of non-limiting example, reference periods are parameterized with sensor, sensor location, or operating condition. Reference periods (single or lookup table) can be reconfigured by taking and using learning from machine operation history, or from other similar machines.

In examples utilizing a memory to store the sensor signal outputs, the reference period can be at least partially derived from future periods as well as prior periods. The similarity measure between a sensed period 310, 320, 330 and the reference period, can be determined using one or more signal processing techniques.

In the first example technique, a weighted Euclidean distance between two observation vectors of the same length is performed to determine a time-domain distance between the two observation vectors, with the weighted Euclidean distance being the similarity measure. The observation vectors are one observation vector of the reference period, and one observation vector of the received period. The Euclidean distance can be determined either with or without an alignment between the observations, although the number of sample points should be the same between the two vectors. This analysis results in a time-domain distance between the received period 320 and the reference period.

In a second example technique, Fourier transforms are performed on the received periods. The Fourier transforms are limited to a defined frequency band or set of harmonics. In some examples, the defined set of harmonics is linked to the shaft frequency. The particular frequency band or set of harmonics can be determined generically for an engine design, or experimentally for a specific engine, or rotor, or a given blade. The Fourier transforms result in a spectral distance between the reference period and the received period 320 being determined, with the spectral distance being the similarity measure.

Fourier transforms can be applied to a sequence of multi-periods (up to including all blades). In this case, a blade strike can be detected by observing that the similarity measure exceeded a threshold, without necessarily identifying which particular blade got a hit. In many applications detection of blade strike doesn't require identification to the blade level. Similarly, the concept of applying the strike detection to multi-periods is applicable to other similarity measures in addition to the Fourier transform similarity measure. One of skill in the art will understand that the more blades that are included in the comparison, the less sensitivity that can be achieved in the detector due to averaging.

In a third example, a maximum cross-correlation strength and corresponding time shift between the received period and the reference period can be determined. The cross-correlation comparison determines a correlation distance based on a certain combination of cross-correlation strength and the corresponding time shift. In this example, the correlation distance is the similarity measure. In some examples, multiple similarity measures can be obtained from the same compared periods and some or all of them used in a certain way for blade strike detection. With continued reference to FIGS. 2-4, FIG. 5 illustrates a cross correlation comparison 410 between the received period 320 and a reference period, with the y axis indicating a strength of the cross correlation, and the r axis indicating a revolution number. Dashed lines 442, 444 indicate an upper bound 442, and a lower bound 444 on an expected sensor noise. Any variations within a range 440 defined by the upper bound 442 and the lower bound 444 are determined to be noise and do not indicate a blade strike event.

Figure 5:
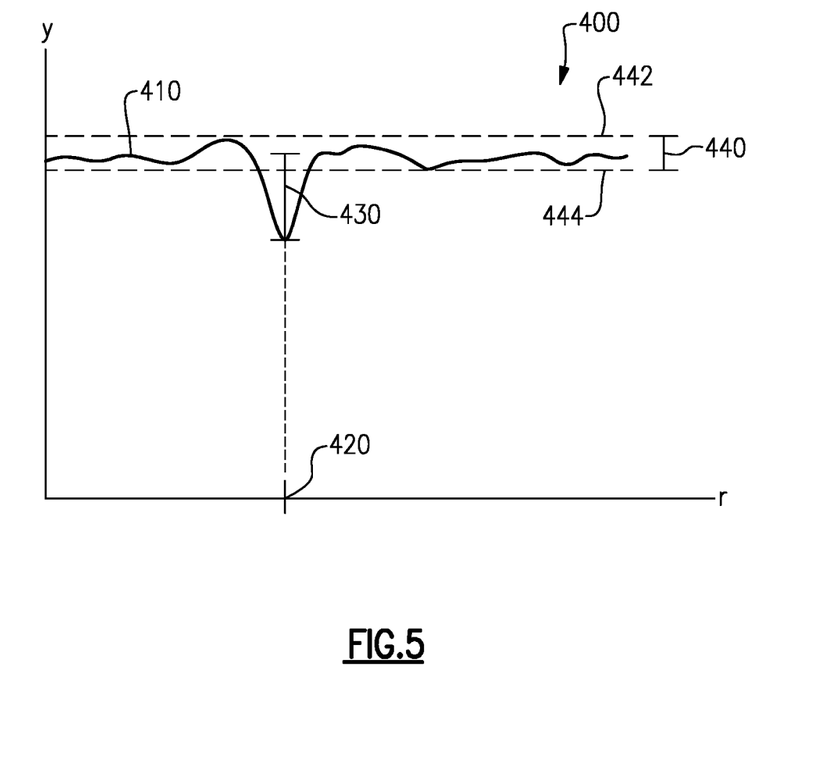
FIG. 5 illustrates a cross correlation comparison between the received waveform and a reference waveform.

The strength of the cross correlation comparison 410 decreases below the lower bound 444 at revolution 420. The revolution 420 corresponds to the period 320 in which the blade ringing occurs. The distance between an expected cross correlation strength and the actual cross correlation strength is the similarity measure. Similarly, in each of the previously enunciated analysis techniques, the variation between an expected result of the comparison and the actual result of the comparison makes up the similarity measure between the periods. It should be understood that the use of a similarity measure and a single threshold is an example for illustrative purposes. A practical system can use several similarity measures concurrently and develop a more sophisticated test for determining blade strike event based on such measures.

While each of the above examples describes comparing a single period of a given waveform against a single period reference waveform, it will be understood by one of skill in the art that the methods for determining similarity measure can be extrapolated to reference signals and sensed signals extended over multiple revolutions and multiple periods. By applying the processes to multiple revolutions, a controller or other processor can determine additional features or information with regards to the event that is not revealed in the application of a single process.

In yet a further example, a variety of parameters (alternately referred to as characteristics) characterizing a detected waveform anomaly, such as the above described blade ringing, can be isolated from the received waveform and stored by the controller 90. The parameters can then be analyzed by the controller 90, in combination with parameters from any other anomalous events, to determine any patterns or trends occurring within the corresponding rotor or in its neighborhood. The determined trends can be either stored in the controller 90, or communicated to a maintenance system or personnel. The maintenance system or personnel can then compare the parameters and trends to examples stored within a debris impact database and assess the severity of the impact based on the comparison. Once the severity has been assessed, the maintenance system or personnel can make any required adjustments to the planned maintenance of the engine 20 in order to account for the impact.

In some examples, the detection system can include a system for detecting and reducing false alarm rates due to known blade vibration patterns, or any other effect.

Figure 6:
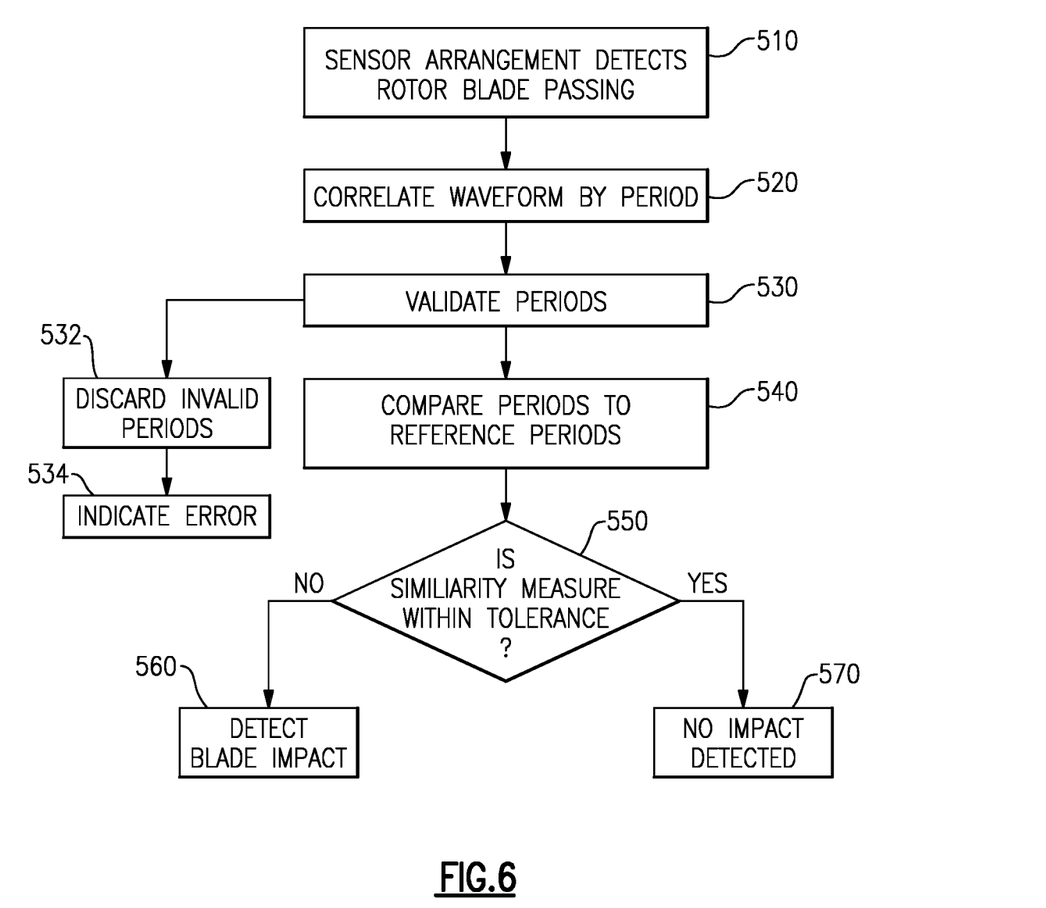
FIG. 6 illustrates a process flow for the above described method.

With continued reference to FIGS. 1-5, and with like numerals indicating like elements, FIG. 6 illustrates a process that is followed in one example implementation.

Initially, the sensor(s) 80, 130 detect the rotor blade passing and generate a waveform output representative of the rotor blade in a "Sensing system Detects Rotor Blade Passing" step 510. The generated waveform includes periods corresponding to all of the rotor blades of the given rotor on a single waveform output.

The single continuous waveform output is then divided into corresponding periods by the controller 90, 190. The periods are then correlated such that each period is correlated with all other corresponding periods in a "Correlate Waveform by Period" step 520. In the example where each period corresponds to a given rotor blade, then all periods corresponding to that rotor blade are correlated onto a single waveform or group of waveforms.

Once correlated, each of the periods are validated according to any of the above described validation techniques in a "Validate Periods" step 530. Any periods that fail the validation are discarded in a "Discard invalidated periods step 532. When an invalid period is detected, an indication of this is noted to the controller 90, 190 in an "indicate error" step 534. If excess invalid signals have occurred the controller can detect a continued sensor error or the like, and notification can be provided to a pilot or a maintenance crew. In alternate systems, the validation can be applied before dividing the full waveform into periods. In yet further alternate systems, the validation can be performed both before dividing the waveform into periods and on each individual period.

If the Periods are validated, the correlated periods are then compared with a reference period or reference periods to determine a similarity measure between the sensed period and the reference periods in a "Compare Periods to Reference Periods" step 540. The similarity measures can be detected and compared in any of the manners described above with regards to FIGS. 3-5. The controller 90, 190 then determines if the similarity measure is within a pre-defined tolerance in a "Is Similarity Measure Within Tolerance" check 550.

If the similarity measure is outside of the tolerance, the controller 90, 190 provides an indication that a blade impact has occurred in a "Detect Blade Impact" step 560. Alternatively, if the similarity measure is within tolerance, the controller determines that no blade impact ahs occurred, and there is no impending blade damage or significant debris inside the engine in a "No Impact Detected" step 570. Even when no impact is detected, relevant data from the waveform may still be captured and retained by a memory or other storage device for trending analysis or other future analysis.

The above described example system is fully automated, performed by the controllers 90, 190, and other flight computers within an aircraft, or other computers in communication with the aircraft controllers 190, 90. One of skill in the art will understand that the above described process flow and automation can be modified or altered within the parameters described in this disclosure and still fall within the present disclosure.

While described above with regards to a gas turbine engine, it will be understood by one of skill in the art that the disclosed blade health monitoring system and method can be adapted for use with any rotor system including land based turbines, compressors, or any other similar system. Furthermore, while the above described systems illustrate a single sensing system adjacent a single rotor within the gas turbine engine, one of skill in the art will understand that any number of rotors within a single turbomachine can be monitored using similar configurations, and the present disclosure is not limited to a single rotor being monitored.

While the system described above utilizes a number of signal periods equal to the number of rotor blades, it is understood that the number of signal periods can be more or less than the actual number of rotor blades. In systems using a number different from the actual number of rotor blades, the signal is broken into periods corresponding to the number of desired periods for signal analysis, rather than the number of rotor blades. The above described analysis can be performed without requiring significant modification in such a system, and such a system is within the scope of this disclosure.

Furthermore, while described above as detecting impending failure to a rotor blade, the above system can similarly utilize the detected ringing of a rotor blade to determine when debris that may damage other components within the gas turbine engine has entered the gas turbine engine.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for monitoring rotating component comprising:
    an electronic control unit (ECU) receiving a sensor signal from a sensor apparatus, wherein the sensor signal comprises a continuous waveform representative of a sensor output;
    retaining the continuous waveform in a memory of the ECU; and
    isolating at least one of at least one characteristic and at least one period of the waveform and analyzing the at least one of at least one characteristic and at least one period and thereby determining an occurrence of a blade strike event using the ECU by determining a similarity measure between a reference period and an isolated period of the continuous waveform, and determining if the similarity measure exceeds a threshold, the similarity measure including at least one of a vector-time domain distance, a spectral distance, and a correlation distance.

2. The method of claim 1, wherein isolating at least one of at least one characteristic and at least one period of the waveform and analyzing the at least one of at least one characteristic and at least one period and thereby determining the occurrence of the blade strike event comprises comparing an isolated period from the continuous waveform against a reference period and determining the presence of the blade strike event based on the comparison.

3. A method for monitoring rotor blades comprising:
an electronic control unit (ECU) receiving a sensor signal from a sensor apparatus, wherein the sensor signal comprises a continuous waveform representative of a sensor output;
comparing a period of the received sensor signal to a reference period using the ECU and determining a similarity measure between the received period of the sensor signal and the reference period, the similarity measure including at least one of a vector-time domain distance, a spectral distance, and a correlation distance; and
determining a presence of a blade strike based on a difference between the reference period and the received waveform.

4. The method of claim 3, further comprising isolating a period corresponding to a single blade of a sensed rotor and generating a correlated set of sequential periods corresponding to the single blade.

5. The method of claim 3, wherein the reference period is one of a static period stored in a memory, a predicted period derived from one or more previous rotations of a corresponding rotor, a predicted period derived from one or more future periods of the corresponding rotor, and a predicted period derived from a combination of previous periods of the corresponding rotor and future periods of the corresponding rotor.

6. The method of claim 3, wherein the received period is a digitized sensor output.

7. The method of claim 3, wherein the received sensor signal is an analog sensor output.

8. The method of claim 3, wherein determining a presence of a blade strike based on a difference between the reference period and the received signal comprises determining that the similarity measure exceeds a threshold.

9. The method of claim 8, wherein the threshold is a dynamic threshold determined from derived characteristics of prior similarity measures.

10. The method of claim 3, further comprising validating the received sensor signal by comparing at least one characteristic of the received sensor signal against an expected value of the at least one characteristic.

11. The method of claim 3, wherein comparing a period of the received sensor signal to a reference period and determining a presence of a blade strike based on a difference between the reference period and the received signal are performed in real time.

12. A gas turbine engine comprising:
a compressor section;
a combustor section fluidly connected to the compressor section;
a turbine section fluidly connected to the combustor section;
wherein each of the compressor section and the turbine section includes a plurality of rotors, each rotor having a plurality of radially outward protruding rotor blades;
an engine case disposed about the compressor section, the combustor and the turbine section;
at least one sensing system disposed within sensing distance of a rotor; and
a controller connected to the sensing system and operable to receive a full waveform output from the sensing system;
wherein the controller further includes a memory operable to cause the controller and the sensing system to perform the steps of
receiving a sensor signal from the sensing system, wherein the sensor signal comprises a continuous waveform representative of a sensor output;
comparing the received sensor signal to at least a reference period using the controller and determining a similarity measure between the received period of the sensor signal and the reference period, the similarity measure including at least one of a vector-time domain distance, a spectral distance, and a correlation distance; and
determining a presence of a blade strike event based on a difference between the reference period and the received signal.

13. A gas turbine engine comprising:
a compressor section;
a combustor section fluidly connected to the compressor section;
a turbine section fluidly connected to the combustor section;
wherein each of the compressor section and the turbine section includes a plurality of rotors, each rotor having a plurality of radially outward protruding rotor blades;
an engine case disposed about the compressor section, the combustor and the turbine section;
at least one sensing system disposed within sensing distance of a rotor; and
a controller connected to the sensing system and operable to receive a full waveform output from the sensing system;
wherein the controller further includes a memory operable to cause the controller and the sensing system to perform the steps of
receiving a sensor signal from the sensing system, wherein the sensor signal comprises a continuous waveform representative of a sensor output;
comparing the received sensor signal to at least a reference period, wherein the reference period is one of a static period stored in a memory, a received period from a previous rotation of a corresponding rotor, a combination of a received period from at least two previous rotations of a corresponding rotor, a received period from a future rotation of the corresponding rotor, a combination of received periods from at least two future rotations of the corresponding rotor, and a combination of a received period from at least one previous rotation of the corresponding rotor and a received period from at least one future rotation of the corresponding rotor; and
determining a presence of a blade strike event based on a difference between the reference period and the received signal.

14. The gas turbine engine of claim 13, wherein the at least one sensing system comprises a plurality of sensors, and wherein each of the sensors is supported via the case within sensing distance of a corresponding rotor.

* * * * *